(12) United States Patent
Epitaux et al.

(10) Patent No.: US 11,409,063 B2
(45) Date of Patent: Aug. 9, 2022

(54) OPTICAL INTERPOSER

(71) Applicant: SAMTEC, INC., New Albany, IN (US)

(72) Inventors: Marc Epitaux, Gland (CH); John Coronati, Colorado Springs, CO (US)

(73) Assignee: SAMTEC, INC., New Albany, IN (US)

( * ) Notice: Subject to any disclaimer, the term of this patent is extended or adjusted under 35 U.S.C. 154(b) by 0 days.

(21) Appl. No.: 16/967,493

(22) PCT Filed: Feb. 5, 2019

(86) PCT No.: PCT/US2019/016649
§ 371 (c)(1),
(2) Date: Aug. 5, 2020

(87) PCT Pub. No.: WO2019/152990
PCT Pub. Date: Aug. 8, 2019

(65) Prior Publication Data
US 2021/0215897 A1    Jul. 15, 2021

Related U.S. Application Data

(60) Provisional application No. 62/686,979, filed on Jun. 19, 2018, provisional application No. 62/626,573, filed on Feb. 5, 2018.

(51) Int. Cl.
*G02B 6/43*  (2006.01)
*G02B 6/42*  (2006.01)
*G02B 6/12*  (2006.01)

(52) U.S. Cl.
CPC ............ *G02B 6/43* (2013.01); *G02B 6/4257* (2013.01); *G02B 2006/12061* (2013.01); *G02B 2006/12147* (2013.01)

(58) Field of Classification Search
CPC .............. G02B 6/43; G02B 6/4257; G02B 2006/12061; G02B 2006/12147
See application file for complete search history.

(56) References Cited

U.S. PATENT DOCUMENTS

| 7,058,247 | B2  | 6/2006 | Crow et al. |
| 8,965,149 | B2* | 2/2015 | Uemura ................... G02B 6/43 385/14 |
| 9,417,415 | B2  | 8/2016 | Tummala et al. |

(Continued)

FOREIGN PATENT DOCUMENTS

WO    2017/132481    8/2017

OTHER PUBLICATIONS

La Porta et al, Scalable Optical Coupling between Silicon Photonics Waveguides and Polymer Waveguides, 2016 IEEE 66th Electronic Components and Technology Conference, p. 461-467.

*Primary Examiner* — John Bedtelyon
(74) *Attorney, Agent, or Firm* — BakerHostetler (57) ABSTRACT

Waveguides of optically transparent interposers are adiabatically coupled to respective waveguides of photonic integrated circuits that are mounted to the optically transparent interposers. In particular, photonic integrated circuits can be mounted to an interposer that has both optical connections and electrical connections. The optical connections of the interposer can be adiabatically coupled to the photonic integrated circuit. The electrical connections can be connected to the photonic integrated circuit and to a host board that also supports an ASIC.

28 Claims, 5 Drawing Sheets

(56) References Cited

U.S. PATENT DOCUMENTS

| | | |
|---|---|---|
| 9,472,710 B1 | 10/2016 | Gates et al. |
| 9,507,086 B2 | 11/2016 | Kobrinsky et al. |
| 9,869,829 B2 | 1/2018 | Bowen et al. |
| 2006/0177173 A1 | 8/2006 | Shastri et al. |
| 2012/0207426 A1 | 8/2012 | Doany et al. |
| 2012/0224804 A1 | 9/2012 | Hashimoto et al. |
| 2014/0042463 A1 | 2/2014 | Uemura et al. |
| 2014/0294342 A1 | 10/2014 | Offrein et al. |
| 2015/0037044 A1 | 2/2015 | Welch et al. |
| 2015/0050020 A1 | 2/2015 | Tanaka |
| 2015/0117821 A1 | 4/2015 | Aoki et al. |
| 2016/0116688 A1 | 4/2016 | Hochberg et al. |
| 2016/0266322 A1 | 9/2016 | Epitaux et al. |
| 2017/0047312 A1 | 2/2017 | Budd et al. |
| 2017/0075066 A1 | 3/2017 | Houbertz et al. |
| 2017/0108655 A1 | 4/2017 | Zarbock et al. |
| 2017/0329081 A1 | 11/2017 | Mahgerefteh et al. |

\* cited by examiner

OPTICAL INTERPOSER

CROSS-REFERENCE TO RELATED APPLICATIONS

This application is the National Stage Application of International Patent Application No. PCT/US2019/016649, filed Feb. 5, 2019 which claims priority to U.S. Provisional Patent Application Ser. No. 62/626,573 filed Feb. 5, 2018 and U.S. Provisional Patent Application Ser. No. 62/686,979 filed Jun. 19, 2018, the disclosure of each of which is hereby incorporated by reference as if set forth in its entirety herein.

BACKGROUND

In many silicon photonic (SiPho) chip-to-fiber optical coupling schemes, an array of fibers needs to be placed in optical alignment with an array of waveguides on a SiPho chip. For example, 2, 4, 8, 12, or some other number of fibers are typically coupled to waveguides on the SiPho chip. The optical coupling is generally divided into two types of coupling. In a first type of coupling, known as edge coupling or butt coupling, the waveguide terminates/originates at an edge of the SiPho chip. In a second type of coupling, known as surface coupling, the waveguide terminates or originates at a structure in the waveguide plane, such as a surface grating or mirror, which directs the optical path out of the SiPho waveguide plane.

DETAILED DESCRIPTION

The present disclosure recognizes that one type of optical coupling has recently been described by La Porta, et. al. 2016 IEEE 66th Electronic Components and Technology Conference (p. 461) (referred to herein as the "La Porta paper"). The La Porta paper refers to this other type of optical coupling as adiabatic coupling. Here adiabatic generally refers to a gradual change in the size or shape of a fundamental mode guided by one or more optical waveguides along a propagation direction. The change in the fundamental mode size and shape is sufficiently gradual that coupling into other modes is minimal so that the fundamental mode size and shape transformation along its propagation path may be very low loss. In this approach, a waveguide of a photonic integrated circuit, such as a silicon photonics (SiPho) chip, is situated adjacent a waveguide in another optical element.

The silicon photonics chip can be part of an optical transceiver that includes a transmitter engine and a receiver engine. During operation, light can be transferred between the two waveguides by adiabatic coupling between the two adjacent waveguides. This is accomplished by tapering the waveguides in their overlap region as that the optical field of the composite waveguide structure adiabatically shifts from one waveguide to the other. Initial results suggest that this type of optical coupling may have relaxed mechanical tolerances as compared to edge coupling. Unlike surface grating coupling, the coupling is not strongly dependent on wavelength. It is recognized that adiabatic coupling can be considered a form of evanescent coupling. Thus, where applicable it should be appreciated that reference to adiabatic coupling herein can be considered as evanescent coupling, or evanescent adiabatic coupling.

Figure 1:
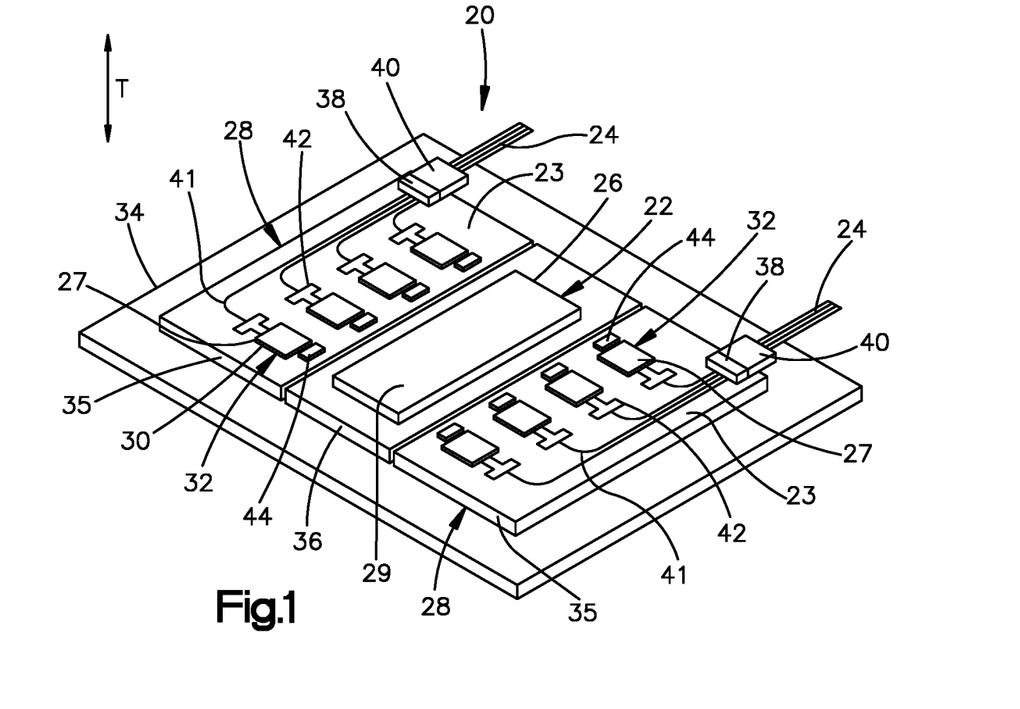
FIG. 1 is a perspective view of a photonically co-packaged ASIC.

With initial reference to FIG. 1, the present disclosure provides an assembly for high-bandwidth communication between an integrated circuit 22 and at least one optical fiber. For instance the at least one optical fiber may be part of at least one fiber cable 24, which may include a plurality of optical fibers. For instance, the high bandwidth communication can be from the integrated circuit 22 to the at least one optical fiber. Alternatively or additionally, the high bandwidth communication can be from the at least one optical fiber to the integrated circuit 22. The integrated circuit 22 can be configured as a microprocessor, field programmable gate array, or the like. Generally, the integrated circuit 22 can be referred to as an application specific integrated circuit (ASIC) 26. Thus, reference herein to the ASIC 26 can apply equally to the integrated circuit 22 unless otherwise indicated, and vice versa. The present disclosure provides an interposer 28 that is disposed between at least one photonic integrated circuit 27 and at least one optical fiber so as to provide for optical communication between the at least one photonic integrated circuit 27 and the at least one optical fiber. The interposer 28 can be configured as an optically transparent interposer 28. For instance, the at least one optically transparent interposer 28 can provide optical communication from the at least one photonic integrated circuit 27 to a respective at least one optical fiber. Alternatively or additionally, the optically transparent interposer 28 can provide optical communication from the at least one optical fiber to the at least one photonic integrated circuit 27. The at least one photonic integrated circuit can include a plurality of photonic integrated circuits. The at least one optical fiber can include a plurality of optical fibers. Additionally, the optically transparent interposer 28 can conduct electrical signals to and/or from an optical engine 32 that is mounted on the optically transparent interposer 28. The optical engine 32 can include the photonic integrated circuit 27. The optical engine 32 can include one or both of an optical transmitter and an optical receiver. The photonic integrated circuit 27 of the optical transmitter can be configured as a SiPho chip 30. Thus, reference herein to the SiPho chip 30 can apply equally to the photonic integrated circuit 27 unless otherwise indicated, and vice versa. The photonic integrated circuit 27 can also be configured as a vertical cavity surface emitting laser (VCSEL) in some examples. Optically transparent materials for use herein for optically transparent structures, including the interposer 28, can include glass or silicon, fused silica, sapphire, borofloat, or any alternative suitable optically transparent material. The assembly may be referred to as a photonically co-packaged ASIC 20 and vice versa.

As illustrated in FIG. 1, the photonically co-packaged ASIC 20 can include a host substrate 34. The host substrate 34 can be configured as a printed circuit board (PCB). The components of the photonically co-packaged ASIC 20 can be mounted either directly or indirectly to host substrate 34. The photonically co-packaged ASIC 20 can include an ASIC interposer 36 that is disposed between the ASIC 26 and the host substrate 34. In one example, the ASIC 26 can be mounted to the ASIC interposer 36. For instance, the ASIC 26 can be flip-chip mounted to the ASIC interposer 36. The ASIC interposer 36 can, in turn, be mounted to the host substrate 34. The ASIC interposer 36 can be a silicon interposer or any suitable alternative interposer as desired.

The optically transparent interposer 28 can be mounted onto the host substrate 34. In particular, the optically transparent interposer 28 can define an inner surface 25 (see FIG. 6) that faces the host substrate 34, and an outer surface 23 that is opposite the inner surface along a transverse direction T. The outer surface 23 can also be referred to herein as a first surface of the optically transparent interposer 28. The inner surface 25 can be referred to herein as a second surface of the optically transparent interposer 28. The optically transparent interposer 28 can include at least one optically transparent region 49 (see FIGS. 4A-4B). The optically transparent region 49 can be supported by the interposer body 35. The optically transparent region 49 can be monolithic with the interposer body 35. Alternatively, the optically transparent region 49 can be attached to the interposer body 35. The optically transparent region 49 and the body 35 can combine so as to define the outer surface 23 of the optically transparent interposer 28.

For instance, the optically transparent region 49 can be glass or silicon. The optically transparent interposer 28 can be disposed adjacent the ASIC interposer 36. The photonically co-packaged ASIC 20 can include a single optically transparent interposer 28, a pair of optically transparent interposers 28, or any number of optically transparent interposers as desired. Description of one of the optically transparent interposers 28 can apply equally to all others of the optically transparent interposers 28. In one example, the AISC interposer 36 is disposed between first and second optically transparent interposers 28.

The optically transparent interposer 28 is configured to receive optical signals from optical fibers in the at least one fiber cable 24. Alternatively or additionally, the optically transparent interposer 28 is configured to transmit optical signals to optical fibers in the respective fiber cables 24. The photonically co-packaged ASIC 20 can include a fiber alignment module 38 that is configured to facilitate optical alignment of the at least one optical fiber of the at least one optical fiber 24 with at least one waveguide 41 (see FIG. 2A) of the optically transparent interposer 28. The at least one waveguide 41 is supported by the optically transparent region 49. For instance, the at least one waveguide can be disposed in the optically transparent region 49.

The fiber alignment module 38 can be supported by the optically transparent interposer 28 at a location adjacent an edge 46 (see FIG. 2A) of the optically transparent interposer 28 to facilitate optical coupling between the at least one optical fiber and its associated at least one optically transparent interposer waveguide 41. Thus, the edge 46 can be referred to as an optical coupling edge of the optically transparent interposer 28. The photonically co-packaged ASIC 20 can further include a fiber cable support 40 that is configured to support the fiber cables 24. Details of the fiber cable support 40, fiber alignment module 38, and optical coupling of signals between the optical fibers and optically transparent interposer 28 are found in PCT International Publication No. WO 2017/132481 A1 filed Jan. 27, 2017 and published Aug. 3, 2017, the disclosure of which is hereby incorporated by reference as if set forth in its entirety herein.

The interposer waveguides 41 of the optically transparent interposer 28 are configured to selectively route the optical signals to and from the optical engine 32. The photonically co-packaged ASIC 20 can further include an optical wavelength division multiplexer/demultiplexer 42 that is supported by the optically transparent interposer 28. The multiplexer/demultiplexer 42 can be incorporated into the optical waveguide circuitry defined by the interposer waveguides 41. The photonically co-packaged ASIC 20 can further include an input/output (I/O) interface 44 disposed between the optical engine 32 and the ASIC 26. Electrical signals traveling to the optical engine 32 can be routed to the I/O interface 44. Similarly, electrical signals traveling from the optical engine 32 can be routed to the I/O interface 44. The I/O interface 44 is configured to modify the electrical signals as appropriate to send them to or from the ASIC 26.

The optical engine 32 can be mounted onto the outer surface 23 of the optically transparent interposer 28. The optical engine 32 can be configured to convert electrical signals to optical signals. Alternatively or additionally, the optical engine 32 can be configured to convert optical signals to electrical signals. Thus, optical signals received from the fiber cables 24 can travel through the waveguides 41 of the optically transparent interposer 28, and are received by the optical engine 32. The optical signals can further travel through the wavelength division demultiplexer 42 if present. The optical engine 32 can convert the received optical signals to electrical signals that can travel to the ASIC 26. The electrical signals can pass through the I/O interface 44 disposed between the optical engine 32 and the ASIC 26. Conversely, electrical signals from the ASIC 26 can travel to the optical engine 32, where they are received by the optical engine 32. The electrical signals can pass through the I/O interface 44 as they travel from the ASIC 32 to the optical engine 32. The optical engine 32 can convert the received electrical signals to optical signals that are transmitted along the waveguides 41 of the optically transparent interposer 28 toward the fiber cables 24 as described above. The optical signals can further travel through the wavelength division multiplexer/demultiplexer 42 if present.

High speed electrical signals can be routed to and from the ASIC 26 in any manner desired. For instance, in one example illustrated in FIG. 1, the ASIC 26 can be flip-chip mounted on the ASIC interposer 36. The ASIC interposer 36 can have electrically conductive vias that route electrical signals between the ASIC 26 and host substrate 34. The electrically conductive vias can extend through the ASIC interposer 36, and thus can be referred to as through-vias. The electrical signals are then routed through electrically conductive vias alone or in combination with electrically conductive traces of the host substrate 34 to the optically transparent interposer 28. The optically transparent interposer 28 can include electrically conductive vias 55 (see FIGS. 4A-4B) that are configured to route the electrical signals to the optical engine 32. The electrically conductive vias 55 can be configured as through-vias that extend through the body 35 of the optically transparent interposer 28.

In another example, high speed electrical signals can be routed to and from the ASIC 26 by wire bonding the ASIC 26 directly to the I/O interface 44. Alternatively, the ASIC 26 can be wire bonded indirectly to the I/O interface 44. In one example, the ASIC 26 can be mounted to the ASIC interposer 36 in the manner described above. The electrical circuitry of the ASIC 26 can be disposed on an exposed surface of the ASIC 26. For instance, the electrical circuitry of the ASIC 26 can be disposed on an outer surface of the ASIC 26 that faces away from the underlying ASIC interposer 36. Similarly, the I/O interface 44 many have its electrical circuitry on its exposed, outer, surface that faces opposite the underlying optically transparent interposer 28. The photonically co-packaged ASIC 20 can include wirebonds that electrically connect the ASIC 26 and I/O interface 44 to each other. In this regard, it should be appreciated in certain examples that the ASIC 26 can be mounted directly to the host substrate 34. In these examples, the photonically co-packaged ASIC 20 can be devoid of the ASIC interposer 36. In still other examples, wire bonds can be routed from the I/O interface 44 to the ASIC interposer 36. The ASIC can be flip-chip mounted to the ASIC interposer 36 in the manner described above, thereby placing the ASIC 26 in electrical communication with the I/O interface 44. Electrical signals can be routed between the optical engine 32 and the I/O interface 44 either by wire bonds or by electrically conductive traces of optically transparent interposer 28.

In certain examples, both the ASIC 26 and the optical engine 32 can be mounted to a single optically transparent interposer. That is, the ASIC interposer 36 can be monolithic with the optically transparent interposer 28 to define a single interposer to which the ASIC 26 and the optical engine 32 are mounted.

In one example, the optically transparent interposer 28 can include an interposer body 35 that defines the inner surface 25 of the optically transparent interposer 28. The interposer body 35 can be optically transparent in certain examples. Thus, the interposer body 35 can both define the waveguides 41 and the electrically conductive vias 55. In other examples described below with reference to FIG. 7, optical properties of the interposer body 35 is not configured to define the waveguides, and can thus be optically opaque, transparent, or translucent. The interposer body 35 can further define all other electrically conductive elements of the optically transparent interposer 28. The interposer 28 can be referred to as an optically transparent interposer because the interposer 28 includes the optically transparent region 49 (see FIGS. 4A-4B) that supports the waveguides 41. In one example, the optically transparent region 49 can be at least partially or entirely defined by the interposer body 35.

Figure 2A:
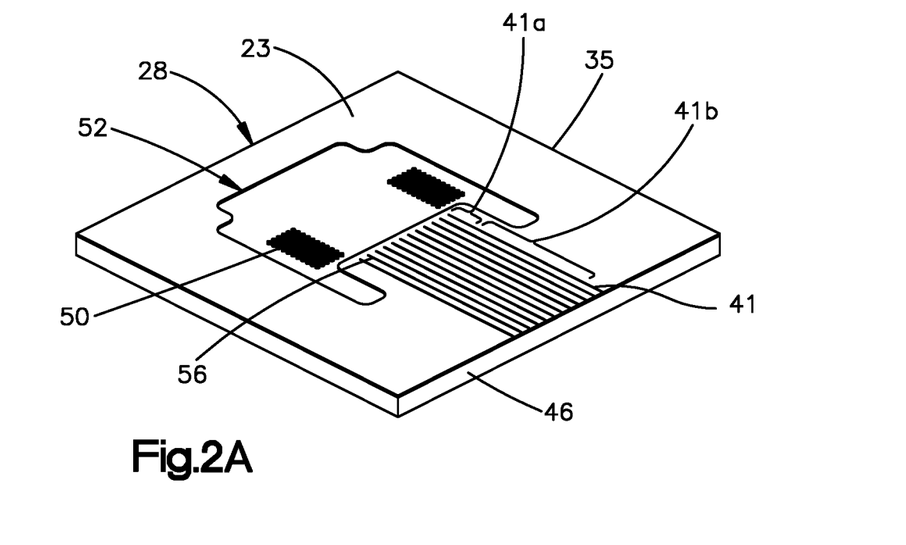
FIG. 2A is a perspective view of an optically transparent interposer.

Referring now also to FIG. 2A, the optically transparent interposer 28 can include the plurality of optical waveguides 41 as described above. The waveguides 41 can be disposed at the outer surface 23 of the optically transparent interposer 28. Alternatively, the waveguides 41 can extend through the optically transparent region 49 of the interposer 28 at a location adjacent the outer surface 23. The location adjacent the outer surface 23 will be understood by one having ordinary skill in the art as sufficiently close to the outer surface 23 so as to evanescently couple to the waveguide 48. For instance, in one example, when the waveguide 41 is not at the outer surface 23, the waveguide can be spaced from the outer surface 23 less than approximately 15 microns, for instance less than approximately 12 microns, and configured to adiabatically couple to the waveguide 48. The term "at least adjacent" includes both "adjacent" and "at." The optically transparent interposer 28 can define an adiabatic coupling region 41a and a mode conversion region 41b. The adiabatic coupling region 41a can be disposed between an optical engine mounting region of the optical interposer 28 and the mode conversion region 41b. As will be described in more detail below, the optical engine mounting region can include a recessed region 52 of the optical interposer 28. Thus, the adiabatic coupling region 41a can be disposed between the optical engine 32 and the mode conversion region 41b when the optical engine 32 is mounted to the optically transparent interposer 28.

Figure 2B:
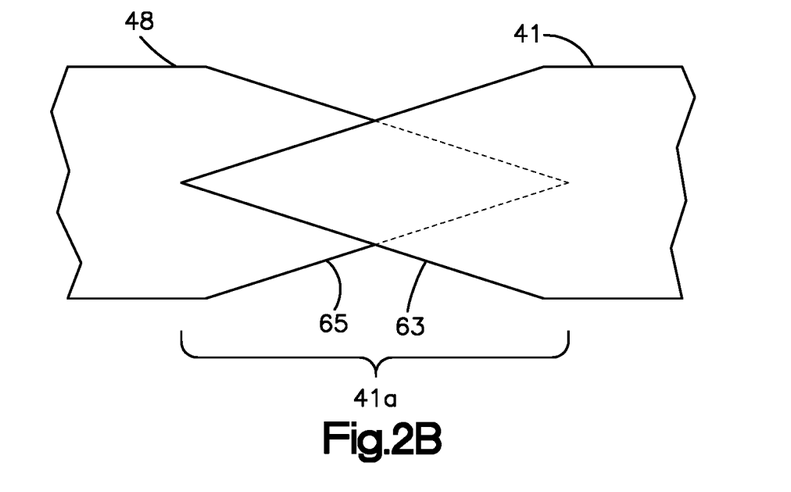
FIG. 2B is a schematic bottom plan view of respective portions of respective waveguides of an interposer and a photonic integrated circuit, shown adiabatically coupled to each other.
Figure 2C:
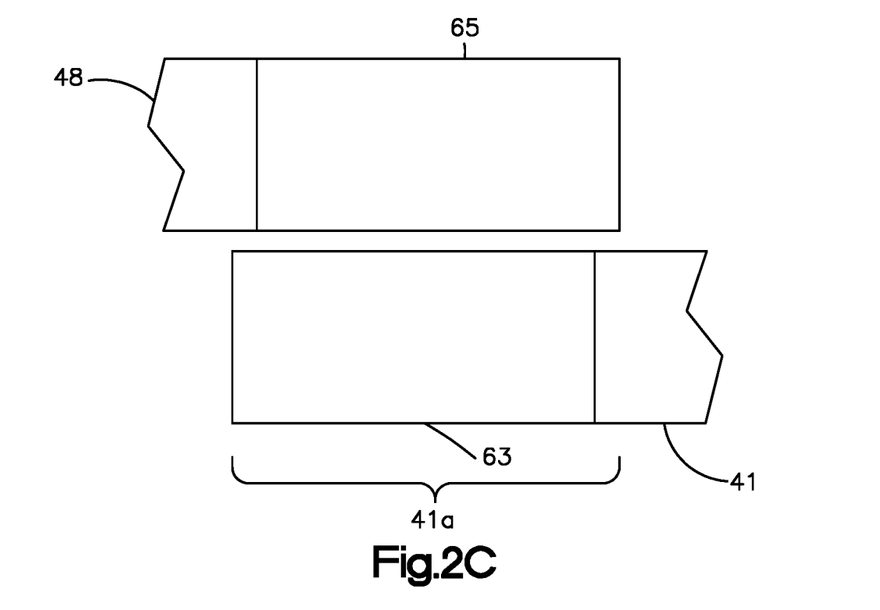
FIG. 2C is a schematic side elevation view of the respective portions of the waveguides illustrated in FIG. 2B.
Figure 2D:
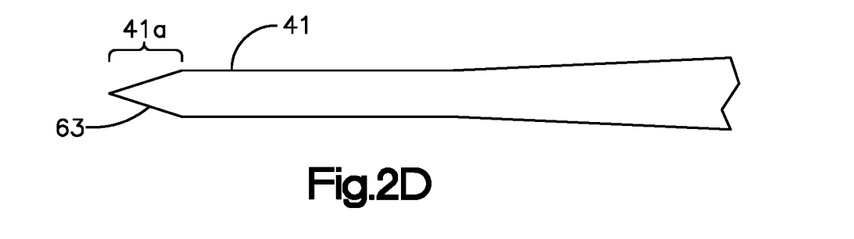
FIG. 2D is a schematic bottom plan view of a portion of the waveguide illustrated in FIG. 2B.

Referring also to FIG. 2D, the mode conversion region 41b (see FIG. 3) can be configured to overcome mismatches in the fundamental mode size between waveguides in the SiPho chip and waveguides in a corresponding optical fiber of the fiber cable 24. For instance, the fundamental mode for light in the 1300 nm to 1600 nm range in a single mode optical fiber that is circularly symmetric can typically have about a 9 micron diameter, while the SiPho waveguide mode size is not circularly symmetric and has dimensions in a range from approximately 0.3 microns×approximately 0.3 microns up to approximately 3 microns×3 microns. The mode conversion region 41b can be configured to transform the mode size to efficiently couple light between the SiPho waveguide and the optical fiber. At the edge 46 of the optically transparent interposer 28, the mode size can be approximately 9 microns in diameter, substantially matching the mode size of single-mode optical fibers, such as SMF28. The optical fibers of the fiber cables 24 can be edge coupled against the edge 46 to place the optical fibers in optical communication with the waveguides 41 of the optically transparent interposer 28. The mode conversion region 41b can be tapered along the direction of propagation. More details of the optical fiber coupling can be found in PCT International Publication No. WO 2017/132481.

In the mode conversion region 41b, the mode size of the optical field can also adiabatically converted or otherwise reduced from a first size of approximately 9 microns in diameter to a second size of approximately 3 microns in diameter. The first size substantially matches the fiber mode size of the fiber cables 24, while the second size substantially matches the mode size, which can be a lateral mode size, of the waveguides 48 of the SiPho chip 30 (see FIGS. 4A-4B). Thus, the mode conversion region 41b can convert the mode size from a first size that substantially matches the mode size of the optical fibers of the fiber cables 24 to a second size that substantially matches the mode size of the waveguides of the SiPho chip 30. The first size can be greater than the second size. Optical signals received from the fiber cables 24 can thus efficiently travel from the waveguides 41 of the optically transparent interposer 28 to the waveguides of the SiPho chip 30. The waveguides 41 that route optical signals to the SiPho chip 30 can be referred to as optical receive waveguides, as is described in more detail below.

At the mode conversion region 41b, the mode size of the optical field can also adiabatically converted or otherwise expanded from approximately 3 micron diameter to approximately 9 microns. Thus, the mode conversion region 41b can convert the mode size from a first size that substantially matches at least a lateral mode size of the waveguides of the SiPho chip 30 to a second size that substantially matches the optical fibers of the fiber cables 24. The first size can be less than the second size. Optical signals received from the waveguides of the SiPho chip 30 can efficiently travel along the waveguides 41 to the fiber cables 24. The waveguides that route optical signals to the fiber cables 24 can be referred to as optical transmit waveguides, as described in more detail below.

The adiabatic coupling region 41a may use tapered waveguides as described by La Porta. In particular, as illustrated in FIGS. 2B-2C, the waveguides 41 can be tapered along the direction of propagation at the adiabatic coupling region 41a so as to define a respective tapered region 63. In one example, the waveguides 41 can have a steeper taper angle at the adiabatic coupling region 41a than at the mode conversion region 41b. Alternatively, the taper angle at the mode conversion region can be steeper or substantially equal to the taper at the adiabatic coupling region 41a. Further, the adiabatic coupling region 41a can be spaced from the mode conversion region 41b along the length of the waveguide 41. Similarly, the waveguides 48 can be tapered to define a respective tapered region 65. The tapered regions 63 and 65 can be aligned with each other at the adiabatic coupling region 41a. The tapered regions 63 and 65 can be inversely tapered with respect to each other. For instance, along a select direction of optical propagation, the tapered region 63 of the waveguide 41 of the optically transparent interposer 28 can be inwardly tapered. The tapered region 65 of the waveguide 48 can be inwardly tapered in a direction that is opposite the select direction. Thus, as the thickness of the waveguide 41 decreases in the select direction of optical propagation, the thickness of the waveguide 48 increases in the select direction of optical propagation.

While the waveguides 41 can be single mode waveguides as described above, it is further appreciated that the waveguides 41 can be configured as multimode waveguides that are adiabatically coupled to the waveguides 48 of the photonic integrated circuit 27. Thus, the photonic integrated circuit 27 can be compatible with multimode operation. Thus, the fibers 24 can further be configured as multimode fibers. As described above with respect to single mode waveguides, the multimode waveguides 41 can further include the mode conversion region 41b configured to overcome mismatches in the fundamental mode size between the waveguides 48 of the photonic integrated circuit 27 and the waveguides 41 in a corresponding optical fiber of the fiber cable 24, along with the adiabatic coupling region 41a of the type described herein.

With continuing reference to FIG. 2A, in some areas of the adiabatic coupling region 41a, a portion of the waveguide optical field extends above the outer surface 23 of the optically transparent interposer 28. This optical field can be captured by an adjacent waveguide 48 in the SiPho chip 30 (see FIG. 4B). Thus, these tapered waveguides 41 at the adiabatic coupling region 41a of the optically transparent interposer 28 can be in optical communication with respective ones of the adjacent waveguides 48 in the SiPho chip 30 when the SiPho chip is mounted to the optically transparent interposer 28. The waveguides 41 can also be tapered at the mode conversion region 41b; however, in this region little or no optical field is present at the outer surface 23 of the optically transparent interposer 28. The waveguides 41 in the adiabatic coupling region 41a and the mode conversion region 41b can be formed by an ion-exchange process to locally raise the refractive index of the optically transparent interposer 28 in the respective region 41a and 41b. The waveguides 41 may also be made using a scanning laser processing method to locally raise the refractive index. The optically transparent interposer body 35 can be formed from Schott D263T eco glass, BOROFLOAT 33, or any suitable glass substrate.

Figure 4A:
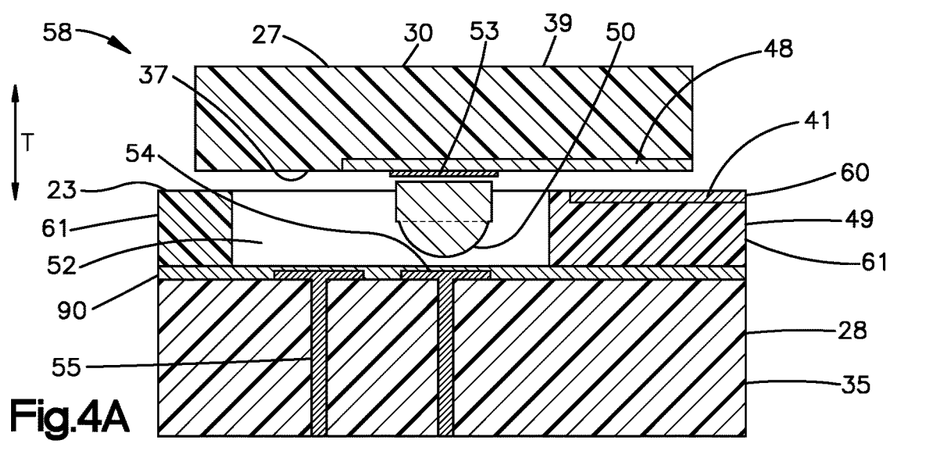
FIG. 4A is an exploded sectional view of a chip assembly including the SiPho chip illustrated in FIG. 3 being mounted to the optically transparent interposer, wherein the section is taken along different planes so as to illustrate both electrical and optical features that are disposed in the respective sectional planes.
Figure 4B:
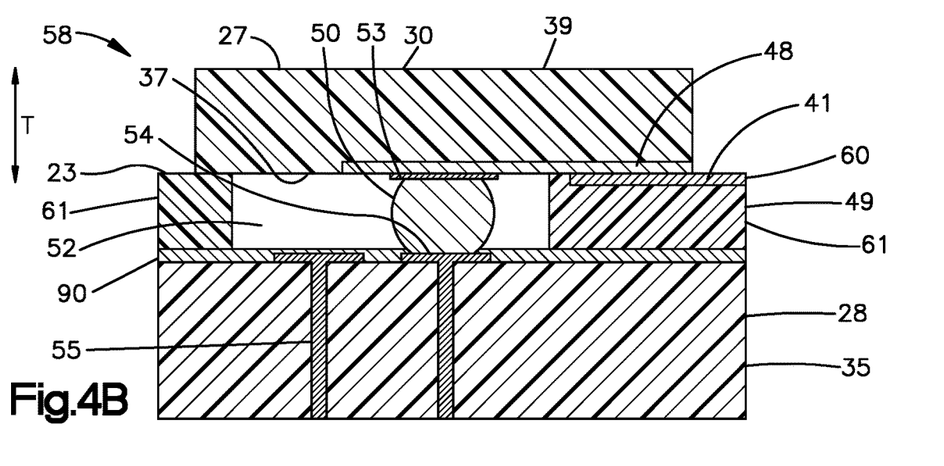
FIG. 4B is a sectional view of the chip assembly illustrated in FIG. 4A.

The photonically co-packaged ASIC 20 can include electrically conductive mounts 50 that are configured to place the optically transparent interposer 28 in electrical communication with the SiPho chip 30 (see FIG. 4B). For instance, the electrically conductive mounts 50 can be electrically connected to electrically conductive vias 55 of the optically transparent interposer 28 and electrical contacts 53 of the SiPho chip 30 (see FIG. 4B). In one example, one or more up to all of the electrically conductive mounts 50 can be configured as stud bumps (see FIGS. 4A-4B). Alternatively or additionally, one or more up to all of the electrically conductive mounts 50 can be configured as copper pillars or alternatively configured solder balls. The electrically conductive mounts 50 can be located on the outer surface 23 of the optically transparent interposer 28 to selectively route electrical signals to and from the optically transparent interposer 28. For instance, the electrically conductive mounts 50 can be disposed in the recessed region 52. Thus, the optically transparent interposer 28 and SiPho chip can be simultaneously placed in electrical communication and optical communication with each other.

Figure 3:
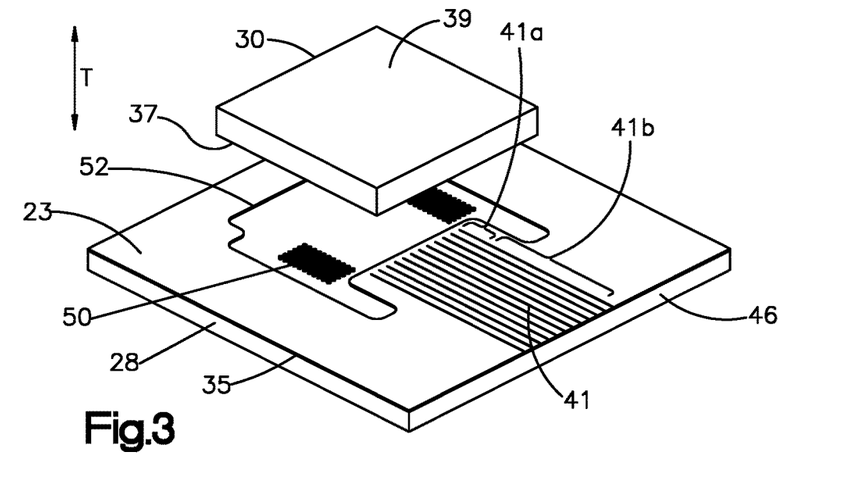
FIG. 3 is an exploded perspective view of a SiPho chip positioned above the optically transparent interposer illustrated in FIG. 2A.

When mounting the SiPho chip 30 to the optically transparent interposer 28, the optically transparent interposer 28 can be simultaneously aligned with the plurality of waveguides 48 and the electrical contact 53 on the SiPho chip 30. It should be appreciated that the electrical contact 53 can define a contact pad configured to be placed in electrical contact with the electrically conductive mount 50. The waveguide 48 and electrical contact 53 of the SiPho chip 30 can be spaced from each other at an accurately controlled distance to sub-micron tolerances using photolithographic fabrication methods. The optically transparent interposer 28 can be fabricated with a matching set of waveguides 41 and electrical contacts 54 having similar placement tolerances to that of the SiPho chip 30. As such, simultaneous alignment of multiple SiPho chips to the waveguides 41 and electrical contacts 54 of the optically transparent interposer 28 can be achieved. It should be appreciated that the electrical contact 54 can define a contact pad configured to be placed in electrical contact with the electrically conductive mount 50. As illustrated in FIG. 3, the SiPho chip 30 can be positioned over the optically transparent interposer 28 along the transverse direction T prior to mounting the SiPho chip 30 onto the optically transparent interposer 28. Thus, the alignment can be along the transverse direction T. Alignment of components along the transverse direction T can be achieved when a straight line oriented along the transverse direction T passes through the components. When components are not aligned along the transverse direction T, they can be moved relative to each other along a direction is perpendicular to the transverse direction T in order to achieve alignment along the transverse direction T. This alignment can be done passively. For instance, the optically transparent interposer 28 and the SiPho chip 30 can include respective alignment members that can be aligned with each other along the transverse direction T. That is, a straight line oriented along the transverse direction T passes through each of the respective alignment members of the optically transparent interposer 28 and the SiPho chip 30 that are to be aligned. When the alignment members are aligned with each other along the transverse direction T, the respective waveguides 41 and 48 and electrical contacts 54 and 53 can be aligned with each other along the transverse direction T as described above. The alignment member can be configured as visible markings or tactile features as desired.

The SiPho chip 30 can be positioned over the recessed region 52, such that the SiPho chip 30 is aligned with the recessed region 52 during alignment of the waveguides and electrical contacts of the SiPho chip 30 and the optically transparent interposer 28. The outer surface 23 can define the recessed region 52. Thus, the outer surface 23 defines a recessed portion at the recessed region 52 that can be recessed toward the inner surface 25 along the transverse direction T with respect to the outer surface 23 outside the recessed region 52. The outer surface 23 can define a second portion that is outside the recessed region 52. Optical coupling portions of the SiPho chip waveguides 48 can rest against the outer surface 23 of the optically transparent interposer 28 outside the recessed region 52 when the SiPho chip 30 is mounted to the optically transparent interposer 28. In particular, the electrical contact 53 of the SiPho chip 30 can be disposed above the recessed region 52 and aligned with the recessed region 52 along the transverse direction T.

While the optical waveguides 41 of the optically transparent interposer 28 are illustrated as straight and linear in FIG. 2A, it should be appreciated that optical circuitry of greater complexity may be fabricated on the optically transparent interposer 28. For instance, the waveguides 41 can curve. Further, the wavelength division multiplexers and/or demultiplexers 42 (see FIG. 1) can be incorporated into the waveguide circuitry. Also, as shown in FIG. 1, multiple optical engines 32, and thus multiple SiPho chips 30, can be mounted on a single optically transparent interposer 28. Similarly, multiple optical fiber cables 24 may mate with the single optically transparent interposer 28.

Referring now to FIGS. 4A-4B, the photonically co-packaged ASIC 20 can include an assembly 58 that, in turn, includes the optically transparent interposer 28 and the SiPho chip 30 mounted to the optically transparent interposer 28. The optically transparent interposer 28 can have a thickness along the transverse direction T that can be. in the range of approximately 300 microns to approximately 1000 microns. It should be appreciated, of course, that the optically transparent interposer 28 can have any suitable thickness as desired. The terms "approximate" and "substantial" and derivatives thereof as used herein, unless otherwise indicated, recognize that variations in size and shape can be the result of many factors, such as fabrication tolerances. In one example, the terms "approximate" and "substantial" can connote within 10% of the stated value along with the stated value. The optically transparent region 49 can define at least a portion of the outer surface 23. In one example, the optically transparent region 49 can define an entirety of the outer surface 23. At least a portion of the outer surface 23 can be defined by an ion exchange layer 60 as described in more detail below. The optically transparent interposer 28 can include a redistribution layer that extends along at least a portion of the outer surface 23 and thus is in electrical communication with the vias 55. The electrical contacts 54 can extend out from the redistribution layer 90.

As described above, one or more up to all of the optical waveguides 41 of the optically transparent interposer 28, can be formed on the outer surface 23. Alternatively or additionally, one or more of the optical waveguides 41 can extend through the optically transparent region 49 of the interposer 28 at a location adjacent the outer surface 23. When the optically transparent region 49 is defined by the interposer body 35, then the interposer body can define the outer surface 23. The ion exchange layer 60 can at least partially or entirely define at least a portion up to an entirety of one or more up to all of the waveguides 41. In one example, the optically transparent interposer 28 can be doped to define a spatially localized region having a refractive index that is raised with respect to the surrounding material of the interposer 28 so as to define at least one waveguide. The optically transparent region 49 can have a thickness or height in the transverse direction T that can range from approximately 10 microns to approximately 250 microns in some examples. For instance, the thickness of the optically transparent region 49 along the transverse direction can be between approximately 10 microns up to approximately 50 microns, particularly when the electrically conductive mount 50 is configured as a stud bump. The thickness or height of the optically transparent region 59 along the transverse direction T can be substantially equal to the thickness or height of the recessed region 52 along the transverse direction T.

The ion exchange layer 60 can have a thickness or height along the transverse direction that is in a range from approximately 1 micron to approximately 15 microns. For instance, the thickness or height of the ion exchange layer can be in a range of approximately 2 microns to approximately 5 microns. In one particular example, the thickness or height of the ion exchange layer can be in a range of approximately 2 microns to approximately 3 microns. In such examples, the optically transparent region 59 can have a height of between approximately 10 microns to approximately 20 microns, such as approximately 12 microns. Thus, the stud bumps 50 have sufficient clearance to be situated in the recess region 52 so as to be compressed in the manner described herein when the SiPho chip is mounted to the interposer 28. It should be appreciated, of course, that the ion exchange layer 60 and the optically transparent region 59 can have any suitable thickness as desired. The waveguides 41 can disposed on the outer surface 23 of the optically transparent interposer 28 or buried in the optically transparent region 49 at a location adjacent the outer surface 23. Either way, it can be said that the waveguide 41 is supported by the interposer body 35 at a location proximate the outer surface 23. In one example, the waveguides 41 can be formed by microstructured glass photonic crystal waveguides rather than thru doping.

The SiPho chip 30 can be mounted above the recessed region 52. The recessed region 52 can have a depth of approximately 50 microns along the transverse direction. It should be appreciated, of course, that the recessed region 52 can have any suitable depth as desired. The recessed region 52 can contain the electrical conductive mount 50 that is configured to place the electrical contact 54 of the SiPho chip 30 in electrical communication with the electrical contact 53 of the optically transparent interposer 28. As described above, the electrically conductive mount 50 can be configured as a stud bump as shown in FIGS. 4A-4B.

The SiPho chip 30 defines a first or inner surface 37 that is configured to face the optically transparent interposer 28 when the SiPho chip 30 is mounted to the optically transparent interposer 28, and a second or outer surface 39 opposite the inner surface 37 along the transverse direction. The one or more optical waveguides 48 of the SiPho chip 30 can be disposed on or adjacent the inner surface 37. The location adjacent the inner surface 37 will be understood by one having ordinary skill in the art as sufficiently close to the inner surface 37 so as to evanescently couple to the waveguide 41. The inner surface 37 of the SiPho chip 30 faces the outer surface 23 of the optically transparent interposer 28 when the SiPho chip 30 is mounted to the optically transparent interposer 28. Because the waveguide 48 is disposed on or adjacent the inner surface 37, the waveguide 41 is disposed on or adjacent the outer surface 23, and the waveguides 48 and 41 are aligned, optical energy can be transferred between the waveguides 41 and 48. Based on the La Porta paper, alignment within 1 micron accuracy that can be achieved with standard semiconductor processing equipment, such as a die bonder, is adequate to achieve high optical coupling efficiency. It may be desirable for the optically transparent interposer 28 and the SiPho chip 30 to have respective coefficients of thermal expansion that are substantially matched. For instance, the coefficient of thermal expansion (CTE) of the optically transparent interposer 28 can be within a percentage above or below the CTE of the SiPho chip 30. The percentage can be substantially 50%, substantially 40%, substantially 30%, substantially 20%, and substantially 10%, wherein "substantially" refers to plus or minus 10%.

Figure 5:
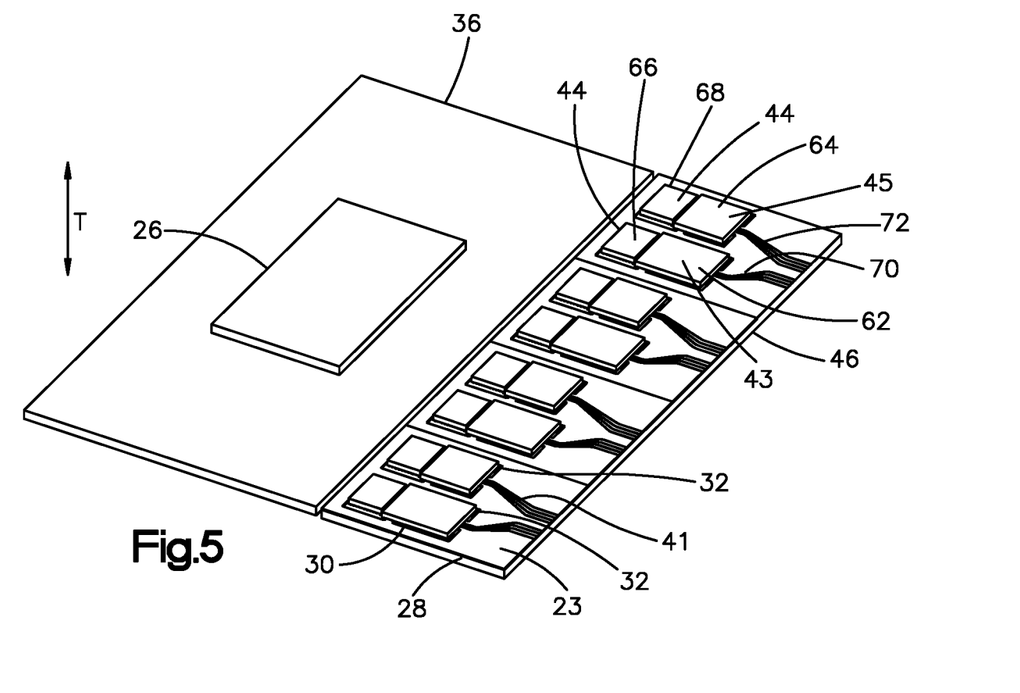
FIG. 5 is a perspective view of the optical transparent interposer assembly illustrated in FIG. 4B, showing the optically transparent interposer assembly disposed adjacent an Application Specific Integrated Circuit (ASIC)

Referring now to FIGS. 4A to 5, the ASIC 26 can be mounted to the ASIC interposer 36. The plurality of optically transparent interposers 28 can be disposed adjacent the ASIC interposer 36 along a plane that is oriented perpendicular to the transverse direction T. Each optically transparent interposer 28 can include at least one optical engine 32 and corresponding at least one I/O interface 41. The optical engine 32 can include at least one of an optical transmitter 43 and an optical receiver 45. The optical transmitter 43 can include a transmit (Tx) photonic integrated circuit (PIC) 62. The optical receiver 45 can include a receive (Rx) PIC 64. Either or both of the Tx PIC 62 and the Rx PIC 64 can be a SiPho chip. For instance, the Tx PIC 62 and the Rx PIC 64 can be separate SiPho chips. Alternatively, the Tx PIC 62 and the Rx PIC 64 can be defined by one single monolithic SiPho chip. It should thus be appreciated that the SiPho chip 30 described above can be configured as the SiPho chip of the optical transmitter 43. Alternatively or additionally, the SiPho chip 30 described above can be configured as the SiPho chip of the optical receiver 45 unless otherwise indicated. Further, the description of the photonic integrated circuit 27 can apply to either or both of the Tx PIC 62 and the Rx PIC 64 unless otherwise indicated. Otherwise stated, the photonic integrated circuit 27 described above can be configured as the Tx PIC 62. Alternatively or additionally, the photonic integrated circuit 27 described above can be configured as the Rx PIC 64 or as a monolithic chip that includes both transmit and receive functions. In this case, the photonic integrated circuit 27 may be referred to as a transceiver PIC.

Electrical signals from the Tx and Rx PIC are routed through the optically transparent interposer 28 to the I/O interface 44. In one example, the I/O interface 44 of the optical transmitter 43 can be configured as a driver 66. Thus, the driver 66 can be electrically connected to the Tx PIC 62. For instance, the driver 66 can be mounted to the optically transparent interposer 28 so as to establish an electrical connection with electrically conductive driver contacts 71. The optically transparent interposer 28 can further include electrically conductive driver traces 73 that place the driver contacts 71 in electrical communication with the Tx PIC 62 in the manner described above with respect to electrical contacts 54.

The driver 66 is configured to condition electrical signals received from the ASIC 26 so that the conditioned signals are suitable for providing a modulated optical signal from the Tx PIC 62. Thus, the conditioned signals travel from the driver to the Tx PIC 62. The I/O interface 44 of the optical receiver 45 can be configured as a transimpedance amplifier (TIA) 68. The Rx PIC 64 can be electrically connected to the TIA 68. For instance, the TIA 68 can be mounted to the optically transparent interposer 28 so as to establish an electrical connection with electrically conductive TIA contacts 75 of the optically transparent interposer 28. The optically transparent interposer 28 can further include electrically conductive TIA traces 77 that place the TIA contacts 75 in electrical communication with the Rx PIC 64 in the manner described above with respect to electrical contacts 54. The TIA 68 is configured to condition the electrical signals received from the Rx PIC 64 to transmit conditioned electrical signals to the ASIC 26. The electrical connections may be thru wire bonds or vias and electrical traces of the optically transparent interposer 28 and ASIC interposer 36 as described above. It should be appreciated that in some embodiments, the driver 66 functionality may be incorporated into the Tx PIC 62. Alternatively or additionally, the TIA 68 functionality may be incorporated into the Rx PIC 64. In this case the co-packaged ASIC 20 can be devoid of one or both of a separate driver 66 and TIA 68.

Figure 6:
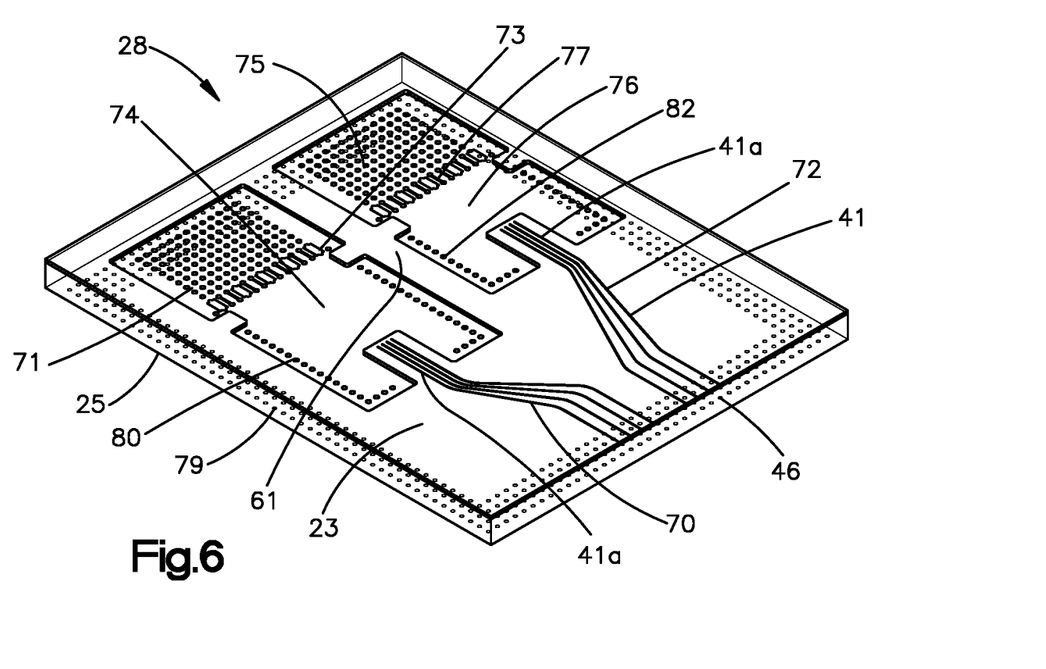
FIG. 6 is a perspective view of the optically transparent interposer.

Referring now to FIGS. 5-6, the optical waveguides 41 of the optically transparent interposer 28 are configured to route optical signals to and from the optical engine 32. For instance, a first group of the optical waveguides 41 of the optically transparent interposer 28 can be configured to route optical signals away from the optical engine 32 to the optical coupling edge 46, and in particular from the optical transmitter 43 of the optical engine 32. The first group of the optical waveguides 41 can be referred to as optical transmit waveguides 70. A second group of the optical waveguides 41 of the optically transparent interposer 28 can be configured to route optical signals away the optical coupling edge 46 to the optical engine 32. The second group of the optical waveguides 41 can be referred to as optical receive waveguides 72.

The optical transmit waveguides 70 are configured to route optical signals to the coupling edge 46 from the adiabatic coupling region 41a as described above. The Tx PIC 62 can be mounted over a Tx recessed region 74. Similarly, the Rx PIC 64 can be mounted over a Rx recessed region 76. It should thus be appreciated that description of the recessed region 52 can apply to either or both of the Tx recessed region 74 and the Rx recessed region 76 unless otherwise indicated. Otherwise stated, the recessed region 52 can be configured as the Tx recessed region 74. Alternatively or additionally, the recessed region 52 can be configured as the Rx recessed region 76. The Tx recessed region 74 can be separate from the Rx recessed region 76. Tx electrical contacts of the optically transparent interposer 28 can be placed in electrical communication with the Tx PIC 62. Rx electrical contacts of the optically transparent interposer 28 can be placed in electrical communication with the Rx PIC 64.

The optically transparent interposer 28 can include a plurality of electrically conductive traces that are configured to route electrical signals between the photonic integrated circuit 27 and the I/O interface 44. For instance, the optically transparent interposer 28 can include a plurality of electrically conductive Tx traces 80 that are configured to route electrical signals between the Tx PIC 62 and the driver 66. Likewise, the optically transparent interposer 28 can include a plurality of electrically conductive Rx traces 82 that are configured to route electrical signals between the Rx PIC 64 and the TIA 68.

The SiPho chip 30 can abut and rest on at least one standoff 61 of the optically transparent interposer 28 so as to be suspended above the recessed region 52. For instance, the optically transparent interposer 28 can include any suitable number of standoffs 61 that accurately register the SiPho chip 30 in the transverse relative to the outer surface 23. The at least one standoff 61 can at least partially define the recess 52. In one example, the standoff 61 can include the optically transparent region 49 and the ion exchange layer 60. The standoff 61 can thus carry at least a portion of the waveguide 41 at the outer surface 23. For instance, the standoff can carry the adiabatic coupling region of the waveguide. The respective waveguides 41 and 48 can thus be efficiently evanescently coupled when the SiPho chip 30 rests on the standoffs and the SiPho 30 is aligned in the two directions orthogonal to the transverse direction (parallel to the plane of the outer surface 23). For instance, the SiPho chip 30 can be configured to rest on three support structures 28 of the interposer 28, thereby providing three distinct regions of contact between the SiPho chip 30 and the underlying interposer 28. Reliable contact between the SiPho chip 30 and the interposer 28 is thereby achieved. In one example, the interposer 28 defines no more than three distinct regions of contact upon which the SiPho chip 30 rests, thereby ensuring that the SiPho chip 30 rests flat against the underlying interposer 28.

In one example, at least one of the standoffs can be defined in an ion exchange layer 60 (see FIGS. 4A-4B). So that evanescent fields from the SiPho chip waveguides 48 and interposer waveguides 41 can overlap, the standoffs can be at most several microns in height and may be in the sub-micron range. In some cases, standoffs may not be necessary. Further, the optically transparent interposer 28 can include a plurality of electrical contacts 79 on the inner surface 25 that are configured to place the optically transparent interposer in electrical communication with the host substrate 34 (see FIG. 1). The electrical contacts 79 can be arranged as a ball grid array (BGA) or can be alternatively configured as desired. For instance, the electrical contacts 79 can be configured as a land grid array, pin grid array, copper pillars, press-fit tails, J-leads, or any suitable configuration. Thus, the optically transparent interposer 28 can be surface-mounted or press-fit mounted onto the host substrate 34. In this regard, it should be appreciated that the first or outer surface 23 can have both optical elements and electrically conductive elements. The optical elements can be defined by the waveguides 41. The electrical elements can be at least partially defined by the electrical contact pads of the electrical contacts 54. The second or inner surface 25 can include only electrically conductive elements and no optical elements. The electrically conductive elements can be defined by the electrical contacts 79.

The optically transparent interposer 28 can further include at least one redistribution layer (RDL) on the inner surface 25, at least one RDL on the opposed outer surface of the interposer body 35, and electrically conductive vias 55 (see FIGS. 4A-4B) that extend from the RDL on the inner surface 25 to the RDL on the outer surface of the interposer body 35. Thus, the electrically conductive vias 55 define an electrically conductive path from the inner surface 25 to the outer surface 23.

Referring now also to FIGS. 4A-4B, the optically transparent interposer 28 can further include an optical layer, which can be in the form of an ion exchange layer 60. For instance, the optical layer 84, and thus the ion exchange layer 60, can be configured as a thin ion exchange sheet. The optical layer 84 can at least partially define the recessed region 52. In one example, the optical layer 84 can be laser cut to at least partially define the recessed region 52, and can be laminated on the interposer body 35. The optically transparent interposer 28 can be built in a wafer process, and the individual dies fabricated during the wafer process can be singulated after wafer level processing using dicing or stealth cutting. Of course, it can be desirable to provide a clean cut on the optical coupling edge 46 of the optically transparent interposer 28. Suitable surface quality on the optical coupling edge 46 may be obtaining using a high-speed dicing saw without further processing.

As illustrated in FIGS. 4A-4B, and as described above, the photonic integrated circuit 27 is configured to be mounted to the interposer 28, such that the photonic integrated circuit 27 is optically coupled to the interposer 28. In particular, the interposer 28 includes at least one optical waveguide 41 such as a plurality of waveguides 41. The photonic integrated circuit 27 similarly includes at least one waveguide 48 such as a plurality of waveguides 48. Each of the waveguides 41 and 48 can include respective adiabatic coupling regions. In one example, the adiabatic coupling regions of the waveguides 41 and 48 can be tapered in the manner described above. Alternatively, it is envisioned that either the waveguides 41 are tapered or the waveguides 48 are tapered at the respective adiabatic coupling regions, and the other waveguides are not tapered at the adiabatic coupling regions. The adiabatic coupling regions of one or both of the plurality of waveguides 41 and 48 can adiabatically couple the waveguides to each other.

Further, the photonic integrated circuit 27 can be electrically coupled to the interposer 28. Thus, the interposer 28 can be disposed between the photonic integrated circuit 27 and the underlying host substrate 34 (see FIG. 1), and can be electrically connected to each of the photonic integrated circuit 27 and the underlying host substrate 34. As discussed above, the assembly 58 can include at least one stud bump 50 such as a plurality of stud bumps 50 that are in electrical connection with each of the interposer 28 and the photonic integrated circuit 27. For instance, the interposer 28 can include at least one electrical contact pad 54 such as the plurality of electrical contact pads 54. Similarly, the photonic integrated circuit 27 can include at least one electrical contact pad 53 such as the plurality of electrical contact pads 53. The assembly 58 can include at least one stud bump 50 such as a plurality of stud bumps 50. The stud bumps 50 can be configured to be mounted to respective pairs of electrical contact pads. Each pair of electrical contact pads can be defined by a respective one of the electrical contact pads 54 and a respective one of the electrical contact pads 53.

In one example, the interposer 28 and the photonic integrated circuit 27 can be joined together only by the stud bumps 50. That is, the interposer 28 and the integrated circuit 27 can be configured so as to not be joined by any other structure other than the stud bumps. Thus, the assembly 58 can be devoid of any other structure that is configured to attach the photonic integrated circuit 27 to the interposer 28. For instance, the assembly 58 can be devoid of epoxy that would otherwise be configured to attach the photonic integrated circuit 27 to the interposer 28. Thus, outgassing that can occur through the use of epoxy can be avoided. It should be appreciated, of course, that an auxiliary attachment structure can further join the interposer 28 to the integrated circuit 27 if desired, such as epoxy or any type of adhesive.

During fabrication, the stud bumps 50 can be first pre-mounted to either the contact pads 53 of the photonic integrated circuit 27, or to the contact pads 54 of the interposer. For instance, the stud bumps 50 can first be mounted to the contact pads 53 of the photonic integrated circuit 27. The stud bumps 50 can define a base and a tip that extends out from the base along the transverse direction T. The base can be substantially cylindrical, and the tip can be dome-shaped, thought it should be appreciated that the base and tip can define any suitable shape as desired. Further, the stud bumps 50 can define any alternative shape as desired. In one example, the base of the stud bumps 50 can be pre-mounted to the contact pads 53 of the photonic integrated circuit 27.

Figure 7:
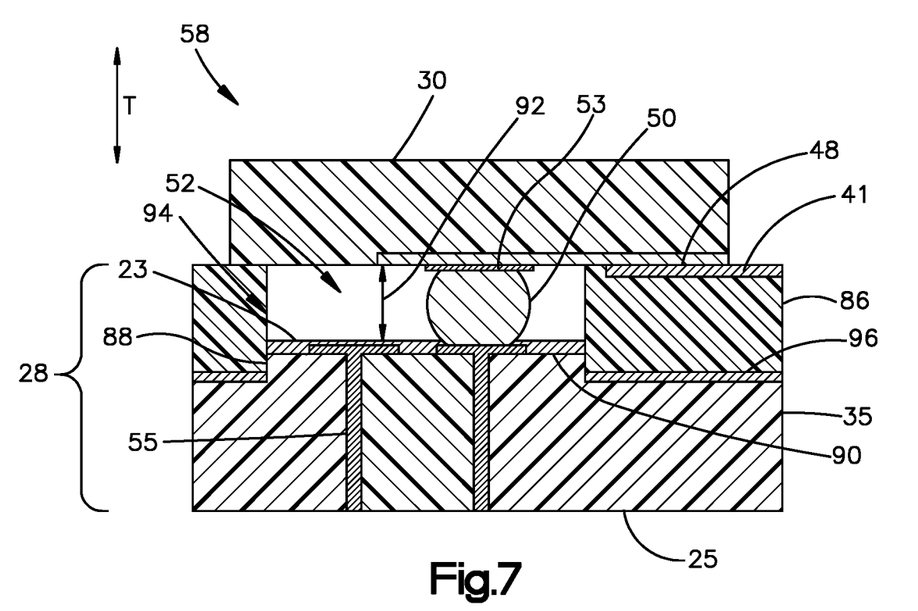
FIG. 7 is a cross-sectional view of a chip assembly similar to the chip assembly illustrated in FIG. 4B, but showing attachment of an interposer to a SiPho chip in accordance with another example.

The stud bumps 50 can then be aligned with the other of the contact pads 53 and 54. For instance, if the stud bumps 50 are pre-mounted to the contact pads 53 of the photonic integrated circuit 27, then the stud bumps can be aligned with the stud bumps 54 of the interposer 28. Next, the photonic integrated circuit 27 and the interposer 28 can be brought into contact with each other until the inner surface 37 of the photonic integrated circuit 27 abuts the outer surface 23 of the interposer 28. In particular, either or both of the photonic integrated circuit 27 and the interposer 28 can be moved relative to the other of the photonic integrated circuit 27 and the interposer 28. When the photonic integrated circuit 27 and the interposer 28 contact each other, the inner surface 37 of the photonic integrated circuit 27 can abut the outer surface 23 at a location adjacent the recessed region 52, such as at the standoffs 61. As illustrated in FIG. 7, the inner surface 37 of the photonic integrated circuit 27 can abut the outer surface 23 at a location adjacent the recessed region 52, such as at an optically transparent layer 86 as described in more detail below. Once the inner surface 37 abuts the outer surface 23, and the waveguides 41 and 48 are aligned with each other, the waveguides 41 and 48 can be evanescently coupled to each other.

With continuing reference to FIGS. 4A-4B, the contact pads 54 of the interposer 28 can be supported by the outer surface 23 in the recessed region 52. The stud bumps 50 can have a height greater than the height of the recessed region 52 along the transverse direction T. Further, the stud bumps 50 can be aligned to mount to the electrical contact pads 54 in the recessed region. Thus, the stud bumps 50 can be compressed along the transverse direction T when the inner surface 37 and the outer surface 23 abut each other. In particular, the stud bumps 50 can be compressed from an initial or uncompressed height to a compressed height. The compressed height can be equal to the height of the recessed region 52 along the transverse direction T. The height of the recessed region 52 can be measured along the transverse direction T from the outer surface 23 in the recessed region 52 to a plane that is perpendicular to the transverse direction T and includes the first surface 23 at a location adjacent the recessed region 52.

Next, the stud bumps 50 can be mounted to the other of the contact pads 54 and 53 so as to mount the photonic integrated circuit 27 to the interposer 28. In particular, the stud bumps 50 can be heated, and an ultrasonic energy can be applied to the stud bumps 50 so as to mount the stud bumps to the other of the contact pads 54 and 53. For instance, when the stud bumps 50 are pre-mounted to the contact pads 53 of the photonic integrated circuit 27, the other of the contact pads 54 and 53 can be defined by the contact pads 54 of the interposer 28. The stud bumps 50 can remain in the compressed position when they are mounted to the contact pads 53 and 54.

As discussed above, the stud bumps 50 can have any suitable size and shape as desired. Further, the stud bumps 50 can be made of any suitable electrically conductive material. In one example, the material is a metal. For instance, the material can be gold. Alternatively, the material can be silver, copper, or any suitable alternative material. In one example, the stud bumps can have an uncompressed height in a range from approximately 15 microns to approximately 50 microns. Further, in one example, prior to compression of the stud bumps, the stud bumps can define a maximum width in a range from approximately 25 microns to approximately 85 microns. The compressive force applied to the photonic integrated circuit 27 and the interposer 28 can be sufficient to deform and compress the stud bumps 50. The applied compressive force can be in the range of approximately 0.3 Newtons to approximately 0.4 Newtons per stud bump 50, such as approximately 0.37 Newton per stud bump 50. Thus, in certain examples, the compressive force applied to the photonic integrated circuit 27 and the interposer 28 can be in the range of approximately 0.3 Newtons to approximately 20 Newtons, or any suitable force as desired, depending for instance on the number of stud bumps 50. The ultrasonic energy applied to the stud bumps can be in the range from approximately 1 Watt to 20 Watts, or any suitable energy level as desired. The stud bumps can be heated to a temperature in a range from approximately 25 degrees Celsius to approximately 450 degrees Celsius, or any suitable temperature as desired. For instance, compression plates used to bring the photonic integrated circuit 27 into contact with the interposer 28 can be heated in the temperature range.

It is recognized that the method of mounting the photonic integrated circuit 27 to the interposer 28 can apply equally to any suitable alternative optical structures that are placed in electrical communication with each other. Thus, the interposer 28 can be referred to as a first optical module, and the photonic integrated circuit 27 can be referred to as a second optical module. The waveguides 41 can be referred to as first optical waveguides, and the electrical contact pads 54 can be referred to as first electrical contact pads. Similarly, the waveguides 48 can be referred to as second optical waveguides, and the electrical contact pads 53 can be referred to as second electrical contact pads.

Referring now to FIG. 7, in another example, the interposer body 35 can be configured to not be optically transparent, and thus can be configured to not define the waveguides 41. For instance, the interposer body 35 can be optically opaque or optically translucent. The optically transparent region 49 of the optically transparent interposer 28 can be defined by an optically transparent layer 86 that is supported by the interposer body 35. For instance, the optically transparent layer 86 can be bonded to or laminated with the interposer body 35, or otherwise attached to the interposer body 35. Thus, the optically transparent layer 86 can define at least a portion of the outer surface 23 of the interposer 28. For instance, the optically transparent layer 86 and the interposer body 35 can combine so as to define the outer surface 23. The optically transparent layer 86 can carry one or more optical waveguides 61 in the manner described above with respect to the optically transparent region 49 of the interposer 28 of FIGS. 4A-4B. Thus, as described above, the first or outer surface 23 can have both optical connections and electrical connections, and the second or inner surface 25 can have only electrical connections and no optical connections. The optical connection can be said to be at the outer surface 23 whether the waveguide is disposed at the outer surface or adjacent the outer surface, as the optical signal is coupled from the waveguide 41 out from the outer surface. The electrical connections of the outer surface 23 can be referred to as first electrical connections, and the electrical connections of the inner surface 25 can be referred to as second electrical connections.

The optically transparent layer 86 and the interposer body 35 can have different optical properties than each other. Further, the optically transparent layer 86 and the interposer body 35 can include different mechanical, thermal, and electrical properties as well. In particular, the optically transparent layer 86 can have properties designed for fabrication of the waveguides 41 of the optically transparent interposer 28, whereas the interposer body 35 can have properties designed for fabrication of the electrically conductive vias 55. In some examples, the optically transparent layer 86 can have only the waveguides 41 and no electrically conductive elements. In this regard, the optically transparent layer 86 can be referred to as an interposer. The interposer defined by the optically transparent layer can be disposed between the photonic integrated circuit and the interposer body 35. For instance, the optically transparent layer 86 can be referred to as an optical interposer.

The interposer body 35, on the other hand, can have only electrically conductive elements and no waveguides 41 or other optically transmissive elements or optical connections. In this regard, the interposer body 35 can be referred to as an interposer. The interposer defined by the interposer body 35 can be disposed between the optically transparent layer and the host substrate. For instance, the interposer body 35 can be referred to as an electrical interposer. Because the optically transparent layer 86 contains the waveguides 41 at least adjacent to the outer surface 23, and the optically transparent layer is mounted to the interposer body 35, and thus supported by the interposer body 35, it can be said that the interposer body 35 supports the waveguides 41. The interposer body 35 and the optically transparent layer can combine to define the resulting optical interposer 28. The interposer body 35 and the optically transparent layer can combine so as to define the outer surface 23, and the interposer body 35 alone can define the inner surface 25.

The interposer body 35 can thus be made from a material suitable for forming the electrically conductive vias 55. In this regard, while the interposer body 35 can be optically opaque or translucent as described above, the interposer body 35 can alternatively be optically transparent. The interposer body 35 does not, however, define the optically transparent region 49 of the interposer 28 in this example because the interposed body 35 is designed to define the electrically conductive vias 55 that extend through it, and not any optically transmissive elements. The interposer body 35 can be made of a glass, crystalline material, or a ceramic. The electrically conductive vias can be formed by sintering an electrically conductive paste or particles that occupy the vias 55 at an elevated processing temperature. The processing temperature may be greater than the softening temperature of the material of the interposer optically transparent layer. The thru via could alternatively be formed by plating inner walls of the interposer body 35 with an electrically conductive material. The electrically conductive material can be copper. Alternatively, the electrically conductive material can be silver. In this regard, it should be appreciated that the electrically conductive material can be any suitable material as desired.

The interposer body 35 can define a raised pedestal 88 so as to define a portion of the upper surface 23 of the interposer 28. In particular, the raised pedestal 88 can define a portion of the inner surface in the recessed region 52. The upper surface 23 of the raised pedestal 88 can be configured to establish an electrical connection with the SiPho chip 30 in the manner described above. For instance, the optically transparent interposer 28 can include the redistribution layer 90 that is formed on the upper surface 23 at the pedestal 88.

The redistribution layer 90 may include one or more layers of conductive metal traces on a dielectric material, such as, but not limited to, polyimide or benzocyclobutene. The redistribution layer 90 can be configured to position the location of the electrically conductive mounts 50 so that they align with matching pads of the electrical contacts 53 of the SiPho chip 30. The pedestal 88 can have a height along the transverse direction T that is sufficient so as to at least partially define the recessed region 52 having a gap 92 between the upper surface 23 at the body 35 and the inner surface 37 of the SiPho chip 30 to accommodate the electrical mount 50 that can extend from the contact pad of the electrical contact 53 to the contact pad of the electrical contact 54. Thus, in the example illustrated in FIG. 7, the pedestal 88 can be configured such that the height of the pedestal 88 along the transverse direction T plus the compressed height of the electrically conductive mount 50 can equal the height of the optically transparent layer 86. The optically transparent layer 86 can define a hole that extends therethrough and is oriented along the transverse direction T, and is aligned with the pedestal 88 along the transverse direction T.

The optically transparent layer 86 can be made of any suitable optically transparent material, such as glass, silicon, fused silica, sapphire, borofloat, or any alternative optically transparent material suitable for forming optical waveguides. One example of a glass that is commercially available is Schott D263T; though any glass suitable for forming optical waveguides may be used. Schott D263T is commercially available by Schott Glass Technologies, Inc. having a place of business in Moosic, Pa. In some embodiments, the optically transparent layer may be formed from drawn glass having sufficiently flat and smooth opposing surfaces such that no polishing step is required prior to forming the optical waveguides 41. The thickness of the optically transparent layer can in the range of 100 to 400 microns, so that it has sufficient mechanical strength for convenient handling and processing. The optical waveguides 41 described in all examples herein may be formed from any known technique, such as, but not limited to, ion-exchange, laser processing, or micro-structuring. The optical waveguides 41 of the optically transparent interposer 28 that extend along the optically transparent layer can be disposed adjacent to and optically coupled with the optical waveguides 48 of the SiPho chip 30 in the manner described above. Accordingly, the optical waveguides 41 can be adiabatically coupled with the optical waveguides 48 of the SiPho chip. Thus, the interposer optically transparent layer can have a bore 94 that is aligned with the pedestal 88 of the body 35. To assemble the optically transparent interposer 28, the optically transparent layer can be placed over the body 35 so that the pedestal 88 of the body 35 is aligned with the bore 94 along the transverse direction T. The optically transparent layer can be bonded to the base using a bonding layer 96. The bonding layer 96 may, for example, be a thin adhesive.

The fabrication of the optically transparent interposer 28 may be done in a batch process where a plurality of optically transparent interposers 28 are formed on a single substrate wafer. The first wafer can define a plurality of interposer bodies 35 adjoined together. For instance, the wafer can define hundreds (e.g., more than one hundred) or even thousands (e.g., more than one thousand) of interposer bodies 35 that are formed in a batch process. A matching second wafer, containing hundreds or thousands of optically transparent layers 86, can be attached to the wafer containing the interposer bodies 35, such that the optically transparent layers 86 are attached to respective ones of the interposer bodies 35 in the manner described above. The attached wafers may be singulated prior to mounting the SiPho chip 30 onto the interposers 28 as descried above. Alternatively, the SiPho chips 30 can be mounted to the optically transparent interposers 28 in the manner described above prior to the singulating step. The attached wafers can then be singulated after the SiPho chips 30 have mounted onto the interposers 28 so as to define the assemblies 58 as described above.

The interposer body 35 can be made from any suitable material such as Borofloat 33 available from Schott Glass Technologies, Inc. The interposer body 35 can have any suitable size so that it has sufficient mechanical rigidity and strength so that it can easily be handled. In one example, the body 35 can have a thickness along the transverse direction T of between approximately 250 microns to approximately 1000 microns, It is appreciated that the examples above disclose glass optical modules having at least one optical waveguide, such as a plurality of optical waveguides, that have an evanescent coupling region that is configured to evanescently couple to a waveguide of another optical module. For instance, the glass optical module can be defined by at least a portion of the interposer 28. In one example, the glass optical module can be defined by the interposer 28 including the interposer body 35. In another example, the glass optical module can be defined by the optically transparent layer. However, any suitable glass optical module can include the waveguides that have respective evanescently coupling regions. The other optical module can be defined by the photonic integrated circuit 27 or any suitable alternative optical module. Fabricating waveguides in glass can have advantages over polymeric optical modules that carry waveguides. For instance, the glass can more readily hermetically seal with other structures. Glass can also be more dimensionally stable than polymers. Further, glass can provide better impedance matching than polymers, which can be useful when the glass carries electrical contacts as described above. Additionally, glass can provide a better match to the coefficient of thermal expansion of the photonic integrated circuit 27.

It should be appreciated that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should be further appreciated that the various alternative embodiments described above with respect to one illustrated embodiment can apply to all embodiments as described herein, unless otherwise indicated.

What is claimed:

1. An interposer for use with a photonically co-packaged application specific integrated circuit, the interposer comprising:
    a first surface and a second surface opposite the first surface, such that the first surface defines a recessed region whereby the first surface defines a recessed portion at the recessed region, the recessed portion being recessed toward the second surface with respect to the first surface outside the recessed region, wherein the first surface has optical connections and electrical connections, the second surface comprises electrical connections and no optical connections, and the electrical connections of the first surface are disposed in the recessed region,
    wherein at least one of the optical connections comprises at least one evanescent coupling region carried at least adjacent to the first surface.

2. The interposer as recited in claim 1, wherein the at least one evanescent coupling region is defined by a tapered region of at least one waveguide that defines a corresponding at least one of the optical connections.

3. The interposer as recited in claim 2, further comprising an interposer body that defines the first and second surfaces, wherein the interposer body is optically transparent.

4. The interposer of claim 2, wherein each at least one waveguide comprises a spatially localized region having a refractive index that is raised with respect to a surrounding material of the interposer body.

5. The interposer as recited in claim 2, further comprising:
    an interposer body that defines the second surface and partially defines the first surfaces; and
    an optically transparent layer that is supported by the interposer body and partially defines the first surface, such that the optically transparent layer and the interposer body combine to define the first surface.

6. The interposer as recited in claim 5, wherein the optically transparent layer is made of glass.

7. The interposer as recited in claim 1, wherein the first and second surfaces are opposite each other along a transverse direction, the interposer further comprising a standoff that defines the recessed region and is offset from the recessed region along a direction that is perpendicular to the transverse direction, wherein the standoff carries at least one of the optical connections.

8. An optically transparent interposer comprising an optical waveguide having an evanescent coupling region that is configured to evanescently couple to a waveguide of a photonic integrated circuit of an optical engine, wherein each at least one waveguide further defines a mode conversion region that is configured to transform a mode size of the optical waveguide at the evanescent coupling region.

9. The optically transparent interposer as recited in claim 8, further comprising a first electrical connection configured to be placed in electrical communication with the optical engine.

10. The optically transparent interposer as recited in claim 9, further comprising a second electrical connection configured to be placed in electrical communication with a host substrate.

11. The optically transparent interposer as recited in claim 10, defining a first surface and a second surface, wherein the first surface carries the first electrical connection, the evanescent coupling region is disposed at least adjacent to the first surface, and the second surface carries the second electrical connection.

12. The optically transparent interposer as recited in claim 11, wherein the second surface does not carry any optical connections.

13. The optically transparent interposer as recited in claim 12, further comprising a plurality of optical connections, wherein at least one of the optical connections comprises at least one evanescent coupling region disposed at least adjacent to the first surface.

14. The optically transparent interposer as recited in claim 13, further comprising an interposer body that defines the first and second surfaces.

15. The optically transparent interposer as recited in claim 14, wherein the at least one evanescent coupling region is defined by at least one waveguide that defines a corresponding at least one of the optical connections.

16. The optically transparent interposer as recited in claim 15, wherein each at least one waveguide is a single mode optical waveguide.

17. The optically transparent interposer as recited in claim 15, further comprising an optically transparent interposer body that defines the first and second surfaces.

18. The optically transparent interposer as recited in claim 15, wherein each at least one waveguide comprises a spatially localized region having a refractive index that is raised with respect to a surrounding material of the interposer body.

19. The optically transparent interposer as recited in claim 8, wherein the waveguide is at least partially defined by an ion exchange layer.

20. The optically transparent interposer as recited in claim 8, further comprising a first surface and a second surface opposite the first surface along a transverse direction, the interposer further comprising a standoff that defines a recessed region and is offset from the recessed region along a direction that is perpendicular to the transverse direction, wherein the optical waveguide is disposed at the standoff, and the recessed region carries a plurality of electrical connections.

21. An interposer comprising:
an interposer body that partially defines a first outer surface of the interposer, and further defines a second outer surface of the interposer opposite the first outer surface; and
an optically transparent layer that is supported by the interposer body and partially defines the first outer surface,
wherein the optically transparent layer comprises an optical waveguide having an evanescent coupling region that is configured to evanescently couple to a waveguide of an optical engine.

22. The interposer as recited in claim 21, wherein the interposer body defines a first electrical connection at the first outer surface, and a second electrical connection at the second outer surface.

23. The interposer as recited in claim 21, wherein the first outer surface at the interposer body is recessed with respect to the first outer surface at the optically transparent layer.

24. The interposer as recited in claim 23, wherein the interposer body comprises a plurality of electrical vias.

25. The interposer as recited in claim 21, wherein the optically transparent layer is made of glass.

26. The interposer as recited in-claim 21, wherein the interposer body is optically opaque.

27. The interposer as recited in claim 21, wherein the interposer body is optically translucent.

28. The interposer as recited in claim 21, wherein the interposer body is optically transparent.

* * * * *